United States Patent
Stahlmann et al.

(10) Patent No.: US 7,222,528 B2
(45) Date of Patent: May 29, 2007

(54) FLUID LEVEL SENSOR

(75) Inventors: Daniel Stahlmann, Williamsburg, VA (US); Isabelle McKenzie, Poquoson, VA (US); Ray Wildeson, Yorktown, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 11/071,820

(22) Filed: Mar. 3, 2005

(65) Prior Publication Data

US 2006/0196263 A1  Sep. 7, 2006

(51) Int. Cl.
*G01F 23/26* (2006.01)
(52) U.S. Cl. .................... 73/304 R; 73/304 C
(58) Field of Classification Search .............. None
See application file for complete search history.

(56) References Cited

U.S. PATENT DOCUMENTS

| | | | |
|---|---|---|---|
| 4,426,616 A | 1/1984 | Maier | |
| 4,428,026 A * | 1/1984 | Maltby et al. | 361/280 |
| 4,555,661 A | 11/1985 | Benson et al. | |
| 4,915,084 A | 4/1990 | Gonze | |
| 4,924,702 A * | 5/1990 | Park | 73/304 C |
| 4,945,863 A | 8/1990 | Schmitz et al. | |
| 4,971,015 A | 11/1990 | Gonze | |
| 5,060,619 A | 10/1991 | Sakurai et al. | |
| 5,089,703 A | 2/1992 | Schoen et al. | |
| 5,103,184 A | 4/1992 | Kapsokavathis et al. | |
| 5,119,671 A | 6/1992 | Kopera | |
| 5,134,381 A | 7/1992 | Schmitz et al. | |
| 5,216,409 A | 6/1993 | Ament et al. | |
| 5,230,322 A | 7/1993 | Curran et al. | |
| 5,231,358 A | 7/1993 | Kapsokavathis et al. | |
| 5,255,656 A | 10/1993 | Rader et al. | |
| 5,301,542 A | 4/1994 | Meitzler et al. | |
| 5,361,035 A | 11/1994 | Meitzler et al. | |
| 5,367,264 A | 11/1994 | Brabetz | |
| 5,416,425 A | 5/1995 | Mouaici | |
| 5,503,004 A | 4/1996 | Agar | |

(Continued)

FOREIGN PATENT DOCUMENTS

DE  199 38 790 A1  2/2001

(Continued)

OTHER PUBLICATIONS

PCT International Search Report for PCT/US02/15931 mailed Aug. 26, 2002.

(Continued)

*Primary Examiner*—Hezron Williams
*Assistant Examiner*—Paul M. West

(57) ABSTRACT

A fluid sensor arrangement (20) includes a sleeve (32) that is adapted to be placed within a container (24). A plurality of conductors (46, 48) and a channel member (50) within the sleeve cooperate to provide a measurement of conductivity of the fluid within the sleeve (32). The conductivity measurement provides an indication of a level of fluid within the container (24). A disclosed example includes a non-conductive channel member (50) having an opening or a channel (52) for directing selected portions of a conductivity field within the sleeve (32) between the conductors (46, 48) for making the conductivity determinations.

22 Claims, 3 Drawing Sheets

U.S. PATENT DOCUMENTS

| | | |
|---|---|---|
| 5,594,163 A | 1/1997 | Suzuki |
| 5,661,405 A * | 8/1997 | Simon et al. ............... 324/697 |
| 5,717,339 A | 2/1998 | Murphy et al. |
| 5,945,831 A | 8/1999 | Sargent et al. |
| 2003/0000303 A1* | 1/2003 | Livingston et al. ....... 73/304 C |

FOREIGN PATENT DOCUMENTS

| | | |
|---|---|---|
| GB | 2 210 459 A | 6/1989 |
| WO | WO 02/27280 | 4/2002 |

OTHER PUBLICATIONS

U.S. Appl. No. 10/150,903, filed May 17, 2002.
U.S. Appl. No. 10/284,433, filed Oct. 30, 2002.
U.S. Appl. No. 10/452,840, filed Jun. 2, 2003.
U.S. Appl. No. 10/991,245, filed Nov. 17, 2004.
U.S. Appl. No. 10/991,579, filed Nov. 18, 2004.
U.S. Appl. No. 11/071,853, filed Mar. 3, 2005.

* cited by examiner

FLUID LEVEL SENSOR

FIELD OF THE INVENTION

This invention generally relates to fluid sensors. More particularly, this invention relates to a sensor for detecting at least a level of fluid within a container.

DESCRIPTION OF THE RELATED ART

A variety of fluid sensors are known. Different sensors are designed for determining different characteristics of a selected fluid. For example, the fuel sensors that are known are capable of providing an indication of a concentration level of one or more fuel components. Many such sensors utilize a capacitor such that the fluid of interest acts as the dielectric of the capacitor. Electrical outputs from the capacitor provide a desired fuel characteristic measurement.

Another known sensor provides an indication of a level of a fluid within a container. One such sensor is shown in the German patent document DE 10047594.

A variety of other types of sensors are known. Most sensors are designed for a specific purpose. There is a need for a level sensor that is capable of operating within highly conductive fluids and that provides good resolution for fluid level measurements. This invention addresses those needs.

SUMMARY OF THE INVENTION

An example disclosed sensor device that is useful for determining at least a level of fluid in a container includes a sleeve that is adapted to be placed in the container. A plurality of conductors within the sleeve are spaced from each other for establishing a conductivity field within the sleeve. A channel member within the sleeve directs a portion of the conductivity field between the conductors and blocks a remainder of the conductivity field between the conductors.

One example includes a controller that determines a conductivity value of fluid within the sleeve from the portion of the conductivity field directed by the channel member. In one example, the controller uses the determined conductivity value to determine a level of fluid within the sleeve. In one example, the level of fluid within the sleeve has a determined relationship to a level of fluid within a container within which the sleeve is placed.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
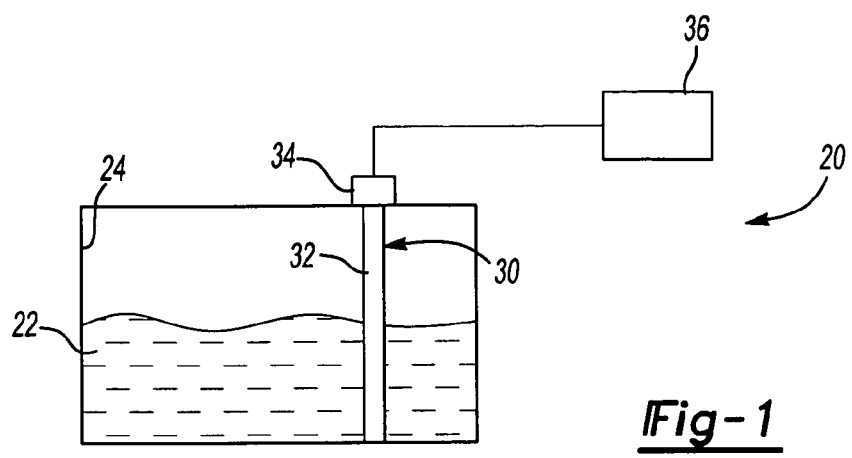
FIG. 1 schematically shows a fluid sensor within a container.

FIG. 1 schematically shows a sensor arrangement 20 for determining one or more characteristics of a fluid 22 within a container 24. In one example, the sensor 20 is at least capable of determining a fluid level within the container 24.

The illustrated example includes a sensor device 30 that is adapted to be placed within the container 24. More specifically, a sleeve 32 is inserted into the container 24 and a housing portion 34 near one end of the sleeve 32 remains outside of the container 24. In one example, the housing portion 34 includes electrical connections for communicating power, signals or both between appropriate portions of the sensor device 30 and a controller 36.

Figure 2:
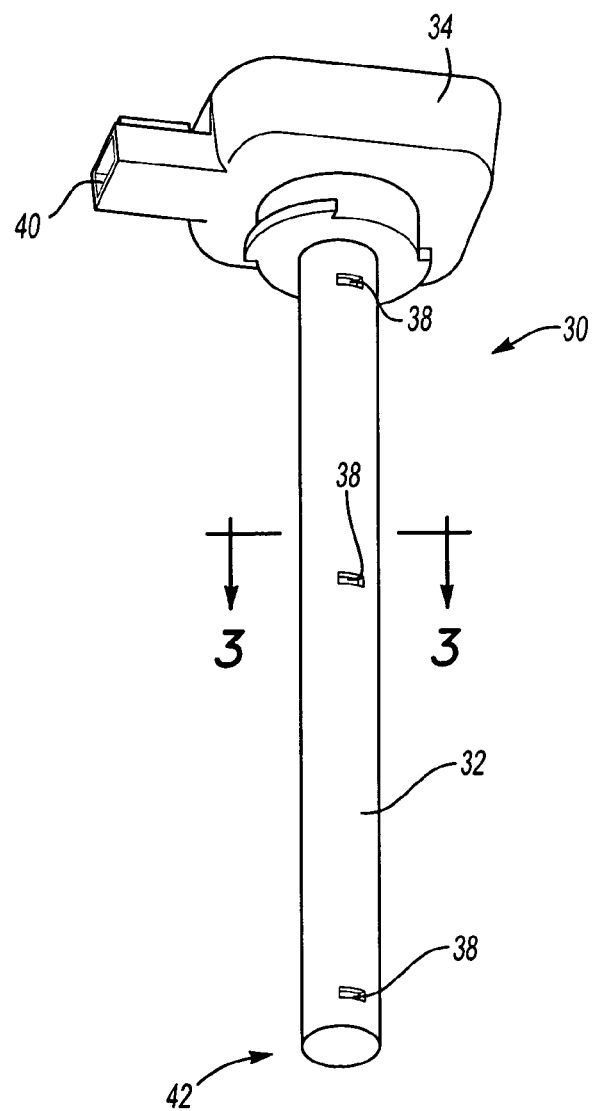
FIG. 2 is a perspective, diagrammatic view of one example sensor embodiment.

As best appreciated from FIG. 2, an example sensor device includes a sleeve 32 including a plurality of openings 38 that allow fluid 22 from within the container 24 to enter an interior, open central portion of the sleeve 32. The openings 38 are strategically positioned to allow a level of fluid within the sleeve 32 to correspond in a determined or expected manner, to a level of fluid within the container 24. That way, determinations regarding a level of fluid within the sleeve 32 provides an indication of a level of fluid 22 within the container 24.

In the illustrated example, the housing 34 includes a connection portion 40 for making appropriate electrically conductive connections with at least one device such as the controller 36. An opposite end 42 of the sleeve 32 supports a capacitive sensor element that provides an indication regarding one or more characteristics of the fluid 22. In one example, a capacitive arrangement provides an indication regarding a concentration level of one or more selected components within the fluid 22. One example use for this example device is to determine a urea concentration level within a mixture used for a selective catalytic reaction converter for controlling vehicle exhaust emissions. In one example, the capacitive element operates according to the teachings of U.S. patent application Ser. No. 10/869,137. The teachings of that document are incorporated into this description by reference.

Figure 3:
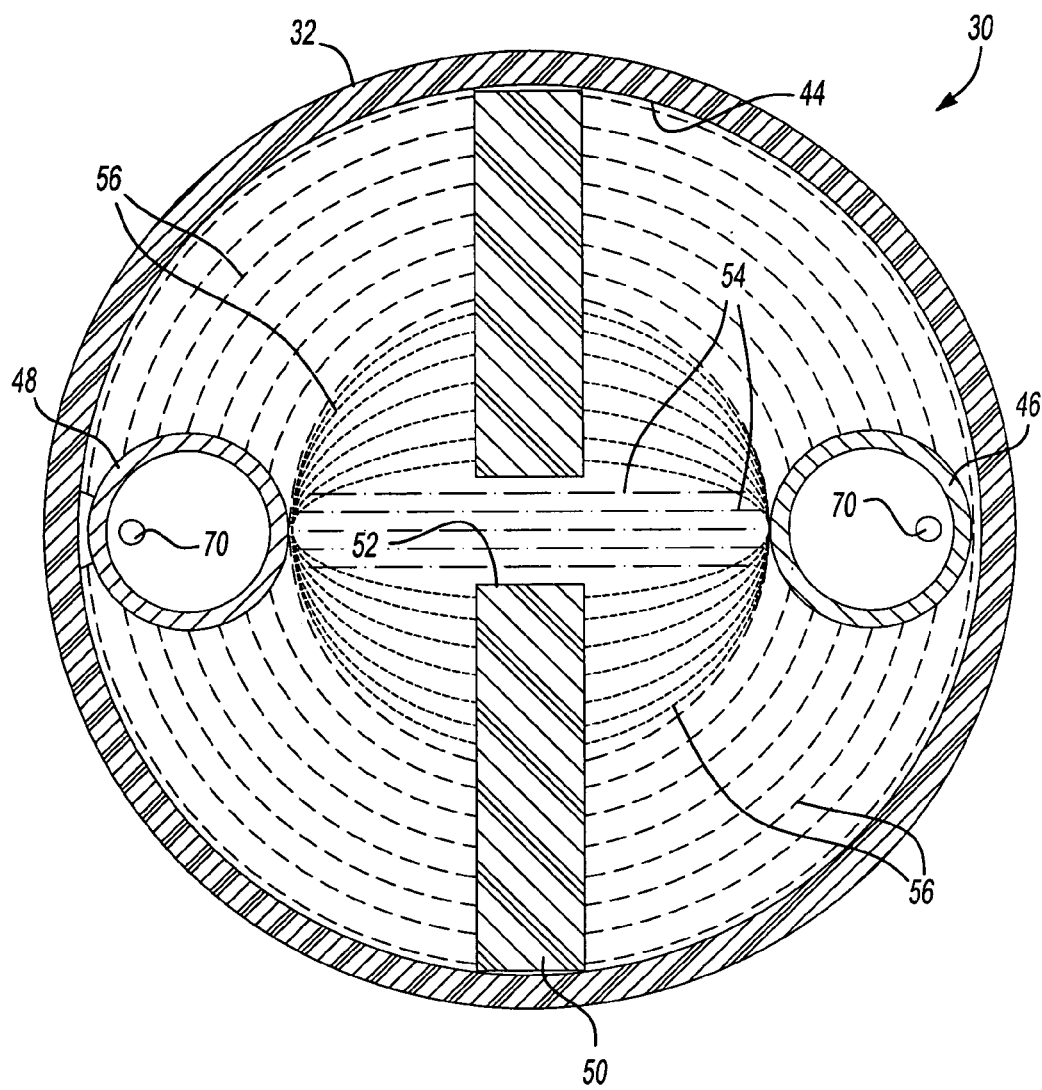
FIG. 3 is a cross-sectional illustration taken along the lines 3—3 in FIG. 2.
Figure 4:
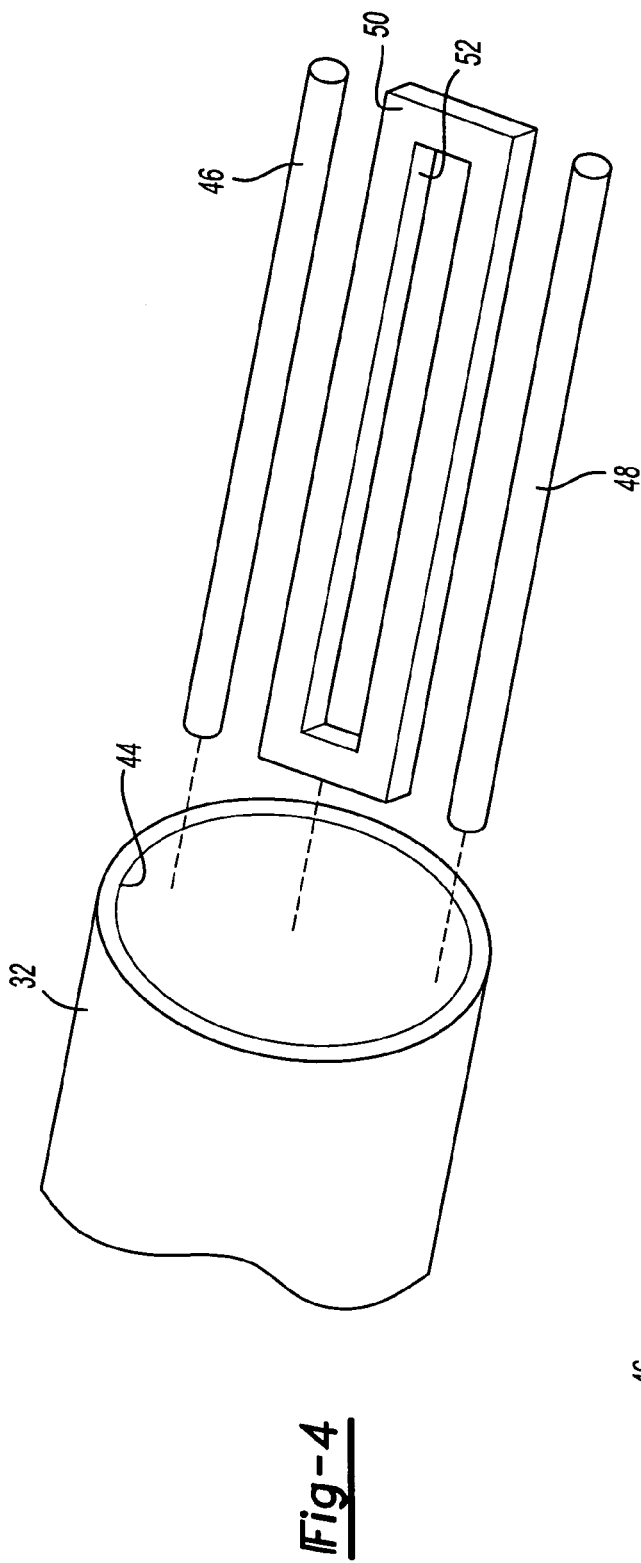
FIG. 4 is an exploded view of selected portions of the embodiment of FIGS. 2 and 3.

Referring now to FIGS. 3 and 4, the open central portion of the sleeve 32 has an interior opening 44 that extends along the length of the sleeve 32. A plurality of conductors 46 and 48 extend along a selected length of the interior of the sleeve 32. The conductors 46 and 48 in this example comprise hollow tubes that extend essentially along the entire length of the opening 44. In one example, the tubes are made of stainless steel.

Selectively powering one or both of the conductors 46 and 48 establishes a conductivity field carried by the conductive fluid within the sleeve 32. The conductivity of the fluid between the two conductors 46 and 48 provides an indication of a level of fluid within the sleeve 32. More fluid within the sleeve corresponds to a higher conductivity value, which can be determined by the controller 36 using known techniques. In one example, the conductors operate as electrodes of a capacitive sensing element. In one example, a voltage output provides an indication of the actual conductivity between the conductors 46 and 48 resulting from the presence of the fluid 22 within the sleeve 32.

The conductivity field within the sleeve 32 may be unmanageably large, in part depending on the fluid within the sleeve 32. The illustrated example includes a channel member 50 within the sleeve 32 to control how much of the conductivity field is used for level measurements. The channel member 50 has an electrically isolating (i.e., non-conductive) body with a central channel or opening 52 extending through a central portion of the channel member 50. The channel or opening 52 directs a portion 54 of the conductivity field between the conductors 46 and 48 as schematically shown in FIG. 3, for example. The electrically isolating body of the channel member 50 blocks a remaining portion 56 of the conductivity field within the sleeve 32. The channel member 50 effectively controls the amount of conductivity field used for making a conductivity measurement between the conductors 46 and 48. By specifically directing the portion 54 of the conductivity field between the conductors 46 and 48 for making a conductivity measurement, the illustrated example provides a level sensing device that has excellent resolution for a variety of fluids. Even highly conductive fluids such as urea can be measured using the example device.

In one example, the sleeve 32 and the channel member 50 each comprise one of polytetrafluoroethylene (e.g., TEFLON®) or a polyphthalamide material. Such materials are selected for an embodiment used for measuring urea levels, for example. One example includes the channel member as a portion of the sleeve 32 integrally formed with the sleeve 32. One example includes wall-like extensions projecting inward in the sleeve to establish an open channel that is smaller than an interior of the sleeve.

In the illustrated example, the conductors 46 and 48 are diametrically opposed from each other within the sleeve 32. The channel member 50 is aligned generally perpendicular to a line extending between the conductors 46 and 48. The opening or channel 52 through the channel member 50 allows for taking conductivity measurements using the portion 54 of the conductivity field that is directed through the opening 52 of the channel member 50.

In one example, one of the conductors 46 is grounded and the other is powered using an oscillator. The controller 36 uses known measurement principles for determining a conductivity level between the conductors 46 and 48. Depending on the measurement, a determination regarding a level of fluid within the sleeve 32 can be made. Calibration and empirical testing can be used in one example to determine a number of values for relating conductivity measurements to fluid levels. As more of each conductor is immersed in the fluid, greater conductivity between them exists and a different measurement occurs, depending on the level of fluid between them.

Figure 5:
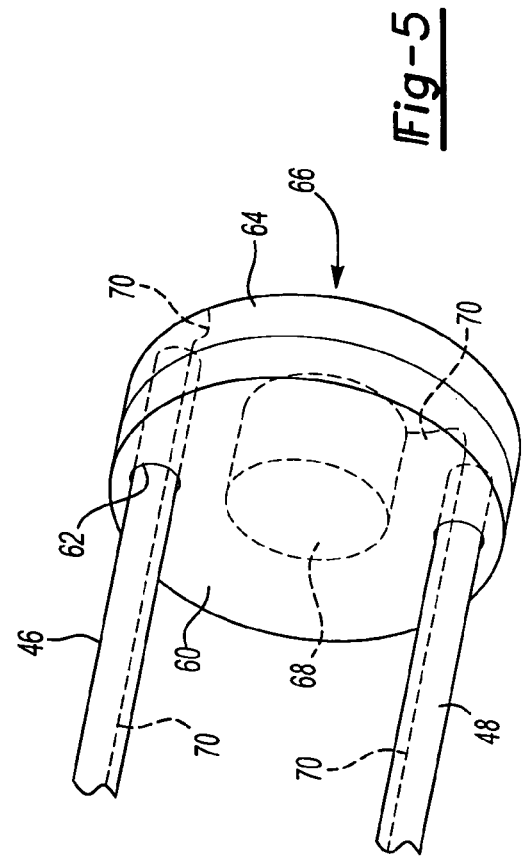
FIG. 5 schematically shows selected features of the example embodiment.

Referring to FIG. 5, one example arrangement for securing one end of the conductors 46 and 48 in a desired position relative to the sleeve 32 and the channel member 50 includes a non-conductive disk member 60. In this example, the conductor 46 extends through an opening 62 in the disk member 60. An end of the conductor 46 is electrically coupled to an electrode 64 of a capacitive sensing element 66 that includes another electrode 68. In one example, the electrode 64 is grounded and the conductor 46 is welded to a portion of the electrode 64. Accordingly, the conductor 46 is grounded, also.

In one example, the capacitive sensor portion 66 including the electrodes 64 and 68 provides a conductivity measurement that is useful for making a concentration level determination regarding the fluid 22. In one example, a conductivity measurement from the capacitive sensor portion 66 provides a base line conductivity measurement useful in making the level determination based upon the conductivity determination resulting from the portion 54 of the conductivity field that is directed by the channel member 50 between the conductors 46 and 48.

In one example, the non-conductive disk member 60 supports the electrode 68 in a desired position relative to the electrode 64. The end of the conductor 48 in this example is embedded in the disk member 60 so that it is held in place and electrically isolated from the electrodes 64 and 68 and the conductor 46.

Opposite ends of the conductors 46 and 48 are secured in place near the housing portion 34. In one example, maintaining a desired alignment of the conductors 46 and 48 and the channel member 50 ensures accurate measurements.

As can be appreciated from FIGS. 3 and 5, the conductors 46 and 48 in this example comprise hollow tubes. The interior portions of the tubes accommodate conductive leads 70 that are used for coupling the electrodes 64 and 68, respectively, to appropriate electronics within the housing 34 or selected portions of the controller 36.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A sensor device useful for determining at least a level of fluid in a container, comprising:
    a sleeve that is adapted to be placed in the container;
    a plurality of conductors within the sleeve and spaced from each other for establishing a conductivity field in fluid within the sleeve; and
    a channel member within the sleeve for directing a portion of the conductivity field between the conductors and blocking a remainder of the conductivity field between the conductors, wherein the channel member comprises a generally planar body having a length between opposite ends, the body has a portion that is solid and uninterrupted along the length.

2. The device of claim 1, including a controller that determines a conductivity value of fluid within the sleeve from the portion of the conductivity field directed by the channel member.

3. The device of claim 2, wherein the controller determines a level of fluid within the sleeve based on the determined conductivity value.

4. The device of claim 3, wherein the determined level of fluid within the sleeve provides an indication of a level of fluid in a container containing the sleeve and the fluid.

5. The device of claim 1, wherein the sleeve and the channel member each comprise an electrically non-conductive material.

6. The device of claim 1, wherein the conductors comprise rods that are diametrically opposite from each other within the sleeve and the channel member has an opening aligned with the rods to accommodate the portion of the conductivity field directed between the rods.

7. The device of claim 6, wherein the channel member comprises a generally planar body having an opening through a central portion of the body.

8. The device of claim 7, wherein the body of the channel member is aligned generally perpendicular to a line extending between the conductors.

9. The device of claim 1, wherein the channel member comprises one of polytetrafluoroethylene or polyphthalamide.

10. The device of claim 1, wherein the conductors comprise hollow rods.

11. The device of claim 10, including a capacitor electrode near one end of the device and wherein one of the conductors is electrically coupled to the capacitor electrode near an end of the one conductor.

12. The device of claim 11, including an electrically isolating member that secures an end of a second one of the conductors in a desired position relative to the one end of the one of the conductors, the isolating member electrically isolating the second conductor from the capacitor electrode.

13. The device of claim 12, wherein the one conductor is welded to the capacitor electrode and the second conductor is at least partially imbedded in the isolating member.

14. The device of claim 11, comprising a second capacitor electrode near the end of the device and wherein the capacitor electrodes provide an indication of a conductivity of a fluid in a container containing the sleeve.

15. The device of claim 14, comprising a housing near a second end opposite the one end of the device and an electrically conductive lead extending from the housing to each of the capacitor electrodes, each of the hollow rod conductors accommodating one of the electrically conductive leads within a central opening through each of the rods.

16. The device of claim 1, wherein the sleeve comprises a hollow body that has a plurality of openings through the body for allowing fluid surrounding the sleeve to enter a central space within the sleeve.

17. The device of claim 1, wherein the channel member comprises a generally planar body having an opening through a central portion of the body.

18. A method of measuring a fluid within a sleeve, comprising the steps of:
providing a plurality of conductors within the sleeve;
providing a channel member within the sleeve for partially obstructing a space within the sleeve between the conductors and leaving a remainder of the space unobstructed, wherein the channel member comprises a generally planar body having an opening through a central portion of the body;
electrically powering at least one of the conductors to establish a conductivity field in fluid within the sleeve; and
determining a conductivity level of fluid within the sleeve associated with a portion of the conductivity field extending between the conductors.

19. The method of claim 18, including using the channel member for blocking a remainder of the conductivity field in the sleeve such that only the portion of the conductivity field extending through the channel member and between the conductors provides an indication of the conductivity value.

20. The method of claim 18, including determining a level of fluid within the sleeve based upon the determined conductivity value.

21. The method of claim 18, comprising:
providing a capacitor near one end of the sleeve;
determining a conductivity value of the fluid based upon fluid between electrodes of the capacitor; and
determining the conductivity level using the determined conductivity value as a baseline factor.

22. The method of claim 17, wherein the channel member comprises a generally planar body having a length between opposite ends, the body has a portion that is solid and uninterrupted along the length.

* * * * *